June 17, 1924.

W. W. SIMONSON ET AL 1,497,764

HEAT INSULATED VESSEL AND PROCESS FOR MAKING THE SAME

Filed June 1, 1918     3 Sheets-Sheet 1

Lewis V. D. Blair
William Robinson
INVENTORS

BY Eason and Steward
ATTORNEYS.

June 17, 1924.

W. W. SIMONSON ET AL 1,497,764

HEAT INSULATED VESSEL AND PROCESS FOR MAKING THE SAME

Filed June 1, 1918   3 Sheets-Sheet 2

INVENTORS

BY *Eason and Stewart*

ATTORNEYS.

June 17, 1924.

W. W. SIMONSON ET AL 1,497,764

HEAT INSULATED VESSEL AND PROCESS FOR MAKING THE SAME

Filed June 1, 1918    3 Sheets-Sheet 3

Patented June 17, 1924.

1,497,764

UNITED STATES PATENT OFFICE.

WILLIAM W. SIMONSON AND LEWIS VD. BLAIR, OF CINCINNATI, OHIO, ASSIGNORS TO THE MANTLE LAMP COMPANY OF AMERICA, OF CHICAGO, ILLINOIS, A CORPORATION OF LLLINOIS.

HEAT-INSULATED VESSEL AND PROCESS FOR MAKING THE SAME.

Application filed June 1, 1918. Serial No. 237,831.

*To all whom it may concern:*

Be it known that WILLIAM W. SIMONSON and LEWIS VD. BLAIR, citizens of the United States, residing at Cincinnati, in the county of Hamilton, and State of Ohio, have invented certain new and useful Improvements in Heat-Insulated Vessels and Processes for Making the Same, of which the following is a specification.

Our invention relates to heat insulated and hermetically sealed vessels and includes a bond or seal to unite adjacent parts of a composite article such as vacuum insulated vessels, within the jackets of which it is desired to maintain a vacuum for an indefinite period of time.

Heretofore, the glass walls of vacuum vessels have been made very thin so that their necks may be secured together at their junction by autogenous welding (a process characterized by the fusion of adjacent parts), but this method is objectionable inasmuch as thin walls are exceedingly fragile and autogenous welding involves localized heating and cooling, and consequent stresses in the completed vessel due to the unequal expansions of different portions of their walls. Glass being a poor conductor of heat, the temperature of remote portions of the walls are much lower than those at and near the weld, the result being that, when the temperatures are equalized by cooling, the highly heated parts contract in a much greater degree than the cooler parts, producing stresses which tend to disrupt the finished vessel, and which will often do so if aided by shocks or by the quick expansion or contraction attending sudden changes in temperature. If autogenous welding of thick glass is attempted, the glass is liable to break during the cooling operation.

The application of autogenous welding to thin glass presents other and additional difficulties, because if the operator is unskilled or careless the temperature of the glass at the weld is likely to be raised above the fusion point and the glass melted away. It is, therefore, highly advantageous and desirable in the making of hermetically sealed vessels or closures, to avoid heating the walls to such temperatures as necessarily attend autogenous welding, however those temperatures may be produced.

Parts of glass articles, such as composite ornamental window panes, have been fused to intervening glass bonds having a relatively lower fusing temperature, but the united parts are expanded and fused at or near the joints, with the result that, upon cooling, contraction is resisted by the cooler and less contractable portions, thereby establishing permanent stresses which accentuate the danger of breakage of the finished article. If the article be a single-wall vessel, having an irregular or angular design, or a double-wall heat-insulated vessel, wherein the walls are united by an angular or abruptly curved piece of glass, the danger of breakage is still more pronounced.

We have found that the desideratum in the production of composite glass articles, is to unite the parts thereof under such thermal conditions that the original molecular dispositions will not be affected, and that, if affected in any considerable degree, the resulting expansion and contraction will be uniform throughout the entire structure.

This result, we have discovered, may be produced by employing a non-vitreous fusible bond, having a tenacity approximating, or even exceeding, the tenacity of glass, which fuses at a temperature below the temperature at which the united parts will fuse, and has the capability, when fused, of directly adhering to such parts, and of acquiring strong adherence when solidified.

When substances such as different kinds of glass, are united by fusion there is a blending of the molecules due to the mutual miscibilities of the substances, but when only one of two substances to be united is fused the union is due to adhesion only, miscibility not being a factor.

When in the claims, the term immiscible is used, it has reference, not to substances one of which will blend into the other if fused and fluid, so as to produce upon cooling a coherent mass, but to substances which after fusion and cooling will remain as two distinct unblended adherent masses.

By using an immiscible bond, and thus avoiding fusion of the united parts of composite articles, said parts may be of any desired thickness, or composed of unfusible material, such as, for instance, artificial fibre. In heat-insulated vessels the outer exposed part may be made from thicker or stronger material than the inner or shielded part, for protective reasons, and it may be made of metal for the same reason. The walls may be made of glass of a refractory nature, which on account of its high fusing point and the consequent strains induced, could not be practically employed in the manufacture of vacuum vessels heretofore produced.

The invention is distinguished from products in which the bond uniting two adjacent fused parts is of vitreous character, the bond herein described being secured to the united walls by adhesion only, said walls being left in their original unfused condition. Adhesion is, however, sufficiently great for all practical purposes, it having been found that ordinarily when fractures have been intentionally made, particles of the glass remain adherent to the bond.

The substance which we may employ is an organic metal compound, usually prepared from an organic exudate, and treated by heat while fused to make it hard and tenacious, chemically stable under ordinary conditions, insoluble in water, quite elastic, and, after having thus been thermally treated, capable of withstanding heat at temperatures considerably above the boiling point of water without becoming fused or softened, or suffering deterioration. There are temperatures at which, as for instance 525° F., it will decompose, but below these temperatures its several useful and characteristic properties remain unimpaired.

This substance is, for reasons already stated, more satisfactory than a fused glass bond, and, furthermore, is capable of universal applicability because it may be made adherent, not only to glass, but to metals and other substances, of which the walls of vessels may be made. It may even be employed as a bond in devices or articles in which fusible glass cannot be used, such as are composed of metal, wood, or artificial fibre or other artificial compositions.

The compound which we prefer to employ, is made from lac, or from shellac which is inherently a poor conductor of heat.

The selected substance, if it be shellac, may be subjected to a preliminary treatment whereby the associated waxy and fatty substances are eliminated. The preliminary process consists in dissolving the ordinary shellac of commerce in a warm and dilute solution of caustic soda, the proportions being 100 parts by weight of shellac, 4.5 parts by weight of caustic soda and 1000 parts by weight of water. The shellac should be slightly in excess of the quantity which is dissolved, in order that all of the caustic soda will be utilized and no free parts of the caustic soda, which may produce undesirable reactions, will remain. After cooling, the impurities are removed from the surface of the still turbid solution, which is then clarified by adding a clarifying agent such as powdered kaolin. The product, which is a clarified solution of a shellac sodium compound in water, is used in the preparation of the above described unfused metal compound, the metal constituent of which may be lead, calcium, barium, zinc or other metal.

In order to produce an unfused shellac lead compound, which when fused will adhere to metal, glass and other substances and acquire great adherence when solidified, we mix a clarified solution of the shellac sodium compound, above described with lead acetate and a sufficient quantity of water to cause the precipitate of the resulting chemical product, which is a shellac lead compound approximating $Pb, (C_{40}, H_{71}, O_{12}) 2$, to appear as small flakes which are easily washed and freed from excess lead acetate and the sodium acetate produced by the reaction. The proportions of these substances are 100 parts by weight of the shellac sodium compound, to 22.5 to 25 parts by weight of lead acetate and water in the stated quantity. The flakes of the shellac lead compound are then dried in any convenient manner.

The compound is now ready for use as a bond. In producing a seal the compound may be applied as a solute in acohol or acetone, or a comminuted mass of the compound may be fused onto one of the parts by slightly heating that part and pressing it against some of the material, or it may be compressed into convenient form, as for instance in the form of a gasket, and placed in position between the parts that are to be united, all three elements being then heated in some convenient way as in an oven of sufficiently high temperature, to produce fusion of the compound, the heat treatment being maintained for a period of from one to nine hours as may be found necessary, according to the mass of material being treated. This heat treatment effectuates elimination of a part or the whole of the constitutional water of the compound, produces polymerization (re-arrangement of the molecules) and increases the viscosity of the fused compound. Elimination of the constitutional water is accompanied by polymerization, condensation and hardening of the compound. The shellac lead compound above described fuses at about 240° F., the barium compound at about 285° F., and the calcium at about 340° F. When a dry mass of the compound is fused, it will adhere to the contacting surfaces of the seal. Prolongation of the heat treatment strengthens the bond, even if the temperature be not raised, but a better bond is produced and the maturing period shortened by maintaining the temperature above the point of initial fusion. These conditions apply to the maturing of bonds composed of substances fusible at other temperatures.

A superior adherent compound may be produced by mixing the shellac lead compound with a wax-free shellac. The wax-free shellac is obtained by taking a portion of a clear solution of shellac sodium compound and adding thereto a small excess of acid such as hydrochloric acid in order to eliminate the sodium in the form of a soluble sodium salt, and precipitate the shellac. The shellac lead compound and the wax-free shellac are preferably mixed in the proportions of one part by weight of the shellac lead compound and two parts by weight of the wax-free shellac. This mixed substance is applied for use and fused in situ in the same manner as the shellac lead compound.

The temperature of fusion may be varied by changing the proportions of these components, the fusion point being raised by increasing the relative quantity of the metallic derivative and also being widely varied by the substitution of different metals in the metallic derivative. For instance, a calcium compound has an appreciably higher initial melting point than a similar compound made with lead, the difference between the initial fusion points of these two compounds being approximately 100° F. When a bond having a low initial fusion temperature is desired, a lac without a metallic substitution may be employed and treated by the thermal process described.

Powdered charcoal may be added to the compound to prevent bubbling, and thus hasten maturing of the bond.

The compound is not herein claimed per se, but is claimed as a bond which is especially useful for uniting parts of hermetically sealed vessels and as a material which is suitable for use in the performance of our process. In their generic aspect, our vessels contain in addition to the vacuum vessels of the prior art with which we are familiar, an added element, namely a binding composition, which, while possessing all of the useful properties of a glass bond and being equally indestructible under normal thermal or other influences, will by adhesion unite with glass or other substances substantially as firmly as glass will unite with glass by cohesion.

In addition to modifying the fusion (flowing) temperatures of the bonding compositions, the chief value of the united compounds rests in their influence over the heat-expansion coefficients of the bonding masses. Thus, a mixture of two parts of wax-free shellac and one part of the lead compound if the same, has very nearly the same coefficient of expansion as a glass composed of silica 66.9%, soda 15.5%, lead oxide 11.7%, potash, .6%, lime 4.7% aluminia .6% while a bonding mass composed of two parts of wax-free shellac and one part of the calcium compound of the same, will usually rend asunder, or chip, the adjacent surfaces of joined glass of the same composition immediately on cooling, or presently thereafter.

Where porous substances as for instance metal or fibre are employed for hermetically sealed vessels, they may be made air tight by applying a coating of the compound in an alcohol or acetone solution and maturing the same by heat treatment.

When we refer to an adherent bond, we mean to exclude solder and kindred substances which bind bodies "partly by chemical attraction and partly by cohesive force" (Century Dictionary and Cyclopedia, volume 7, edition of 1899.)

The drawings illustrate several forms of vessels in which the bond may be used.

Referring to Figures 1, 2, 3 and 4, A, is the outer jacket, which at the upper end is provided with a neck, $a$, an internal seat, $a^1$, and an external flange, $a^2$.

Figures 1, 2, 3, 4:
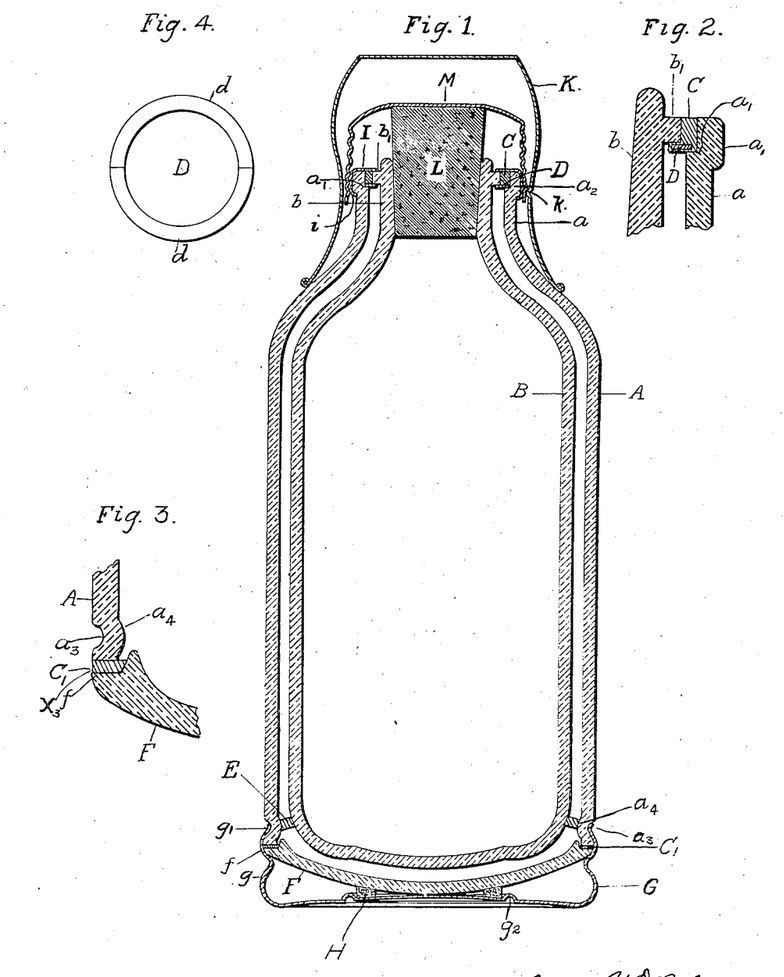
Figure 1, shows a vertical section of one form of heat-insulated or vacuum vessel, in which our bond may be used.
Figure 2, is a fragmentary enlarged sectional view showing a bond disposed between the concentric necks of a heat-insulated or vacuum vessel.
Figure 3, is a fragmentary sectional view showing a bond uniting the parts of a sectional jacket.
Figure 4, represents a sustaining or carrying ring.

B, is a container preferably made of glass, disposed within the jacket, A, and having at its upper end a neck, b, which is provided with an external flange, b¹, the diameter of which is slightly less than the internal diameter of the neck, a, to admit of the passing of the neck, b, through the neck, a.

C, represents an hermetical seal of a composition herein described, this composition being an organic substance which, as above stated, is capable, when fused and solidified, of strongly adhering to the necks of the jacket and the container.

The seat, a¹, is situated slightly below the flange, b¹, so as to leave room for a thin sustaining ring, D, between the seat and flange. This ring, D, is of such diameter that it may fit within the seat, a¹, and is of such width as to extend inward beyond said seat, a¹, and underneath the flange, b¹. Said ring is cut, split or made in sections, d, so that it may be readily placed in position, the parts thereof being separately introduced under the flange, b¹, when the container is lifted to admit of the insertion. The composition constituting the seal, C, may be applied to the ring, D, in such manner as to extend from the seat, a¹, to the underside of the flange, b¹, to both of which elements it becomes firmly adherent when fused and solidified, or it may be introduced in such manner as to fill the unoccupied space between the necks. The ring, D, may act as a carrier for the composition constituting the bond, and, when the device is completed, assist in sustaining the super-imposed parts and cause the composition to be under a compressional instead of a tensional strain. If the composition is applied to the ring before it is placed in position, the ring should be heated so that the composition will adhere thereto without pressure. In some instances the ring may be dispensed with and the unfused composition packed into the space between the seat, a¹, and the flange, b¹, before fusion and adhesion take place.

The jacket, A, is provided near its lower edge with a contracted portion which produces on the outside of said jacket a circumferential groove, a³, and an internal circumferential bead, a⁴.

The jacket, A, is provided with a dished bottom, F, having a marginal seat, f, for receiving the lower edge of the jacket, A. A bond, C¹, of our composition is disposed between the seat, f, and the edge of the jacket, A, so that when fused, the composition will effectually secure the bottom, F, in position.

Braces, E, (which may be a continuous ring) span the space between the jacket, A, and the container, B, the bead, a⁴, constituting a support therefor. These braces tend to prevent a pendulous movement of the container within the jacket, and they may be made of our bonding material or other material associated with our bonding material and caused to adhere to the jacket and container by heat treatment.

G, is a substantially flat cap, the rim, g, of which is crimped into the groove, a³, of the jacket, A, at, g¹. The cap, G, is provided with a circular corrugation, g², in order to stiffen the same.

H, is a cushion of felt or cork which may be in the form of either a ring or circularly arranged separate pieces. This cushion rests upon the cap, G, just within the corrugation, g², which prevents its lateral displacement, and it extends upward into contact with the bottom of the jacket. This cushion relieves the vessel of shocks, and tends to prevent the fracture of any of its parts.

The top of the jacket is provided with a protecting ring, I, constituting a portion of the outer jacket. This ring extends over the joint between said jacket and the container, B, and has a flange, i, crimped to engage the underside of the flange, a², whereby it is retained in a fixed position on the vessel. This protecting ring is externally threaded for the reception of the threaded cylindrical portion of a cap, M. The mouth of the container B, is closed by a cork, L, which is securely held in position by the cap, M. This cap may be screwed up or down, in order to be removed and thus release the cork, L, or press it downward into its seat in the neck of the container, B.

K, is a drinking cup of sufficient internal diameter to telescope over the threaded portion of the cap, M, inwardly projecting indentations of teats, k, being provided for engagement with the threads of said cap.

Figures 5, 6:
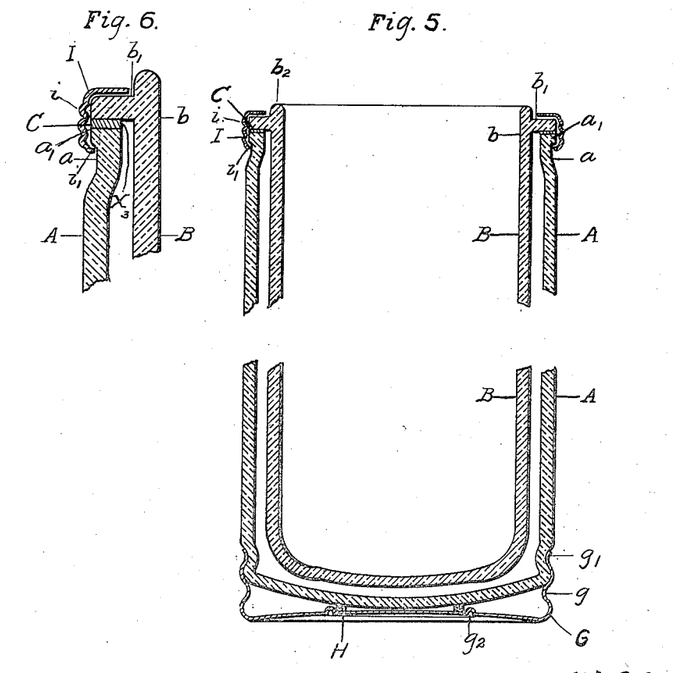
Figure 5, shows a vertical section of a modified form of heat-insulated or vacuum vessel in which our bond may be used.
Figure 6, is an enlarged fragmentary sectional view of the modified construction of Figure 5.

In the form shown in Figures 5 and 6, the internal seat, a¹, and the ring, D, are dispensed with, and the external flange, b¹, is made of sufficient diameter to extend over the upper edge of the neck, a. In this construction the bonding composition is disposed between the flange, b¹, and the upper edge of the neck, a, upon which it rests. In this position, the strains borne by the bonding composition, are entirely compressional.

It is not necessary, to provide a separate bottom for the outer jacket of a heat insulated or vacuum vessel of this type, inasmuch as the container, B, may be introduced through the neck of the jacket, A, which is large enough to receive it.

The protecting ring, I, and cap, G, used in this construction, may be identical with those employed in connection with the heat-insulated or vacuum vessel disclosed in Figure 1.

Figure 7:
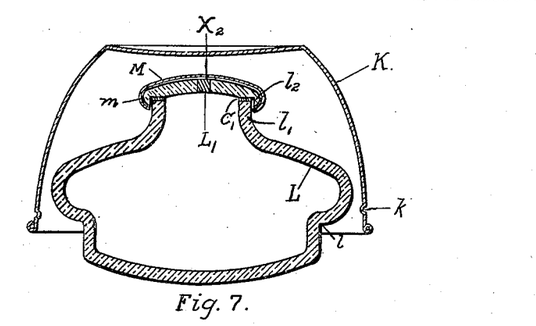
Figure 7, is a sectional view of a heat-insulated or vacuum stopper and a drinking cup.

The heat-insulated or vacuum stopper, shown in Figure 7, is hollow, and provided with a seat, l, which is ground or otherwise finished to conform to the opening of the container, B, in order to effectively close the container. The stopper is provided with an upwardly projecting neck, $l^1$, upon which is supported a closing cap, $L^1$, having a circumferential depending flange, $l^2$. The bonding material, $C^1$, rests upon the upper margin of the neck, $l^1$, and between said margin and periphery of the cap, $L^1$. A protective cap, $M^1$, of metal or other suitable material, is spun or crimped over the margin of the cap, $L^1$, so as to become permanently attached thereto. The crimped portion, $m^1$, of the cap, $M^1$, conceals the bonding material from view. The cap, $L^1$, may be provided with exhaust opening, $X^2$, through which the vacuum may be drawn in the usual way.

K, is a drinking cup, having an inwardly extending bead, $k$, which is adapted to engage the external screw threads of the protecting ring, I, of the heat-insulated or vacuum vessel. This drinking cup serves as a locking means for the stopper, L.

The modified heat-insulated or vacuum bottle shown in Figures 8, 9, 10 and 11, is of approximately spherical instead of cylindrical form. The container, B, is of one piece, like the containers shown in Figures 1 and 5, but the jacket instead of being continuous, is composed of an upper section, A, and a lower section, $A^1$, which, except for an exhaust opening, X, is closed at its bottom. The section, A, is provided with a neck, $a$, having an inwardly projecting flange, $a^1$, extending over the edge of the neck, $b$, of the container, B, the bonding material being disposed between said flange and said edge, and, if desired, made to fill the space between the necks, $a$, and, $b$. In the construction shown in Figure 12 the jacket, A, is thicker than container, B, and its neck, $a$, is unflanged, the bonding composition being disposed within the annular space between the necks, $a$, and $b$.

Figures 8, 9, 10, 11, 12, 13, 14, 15:
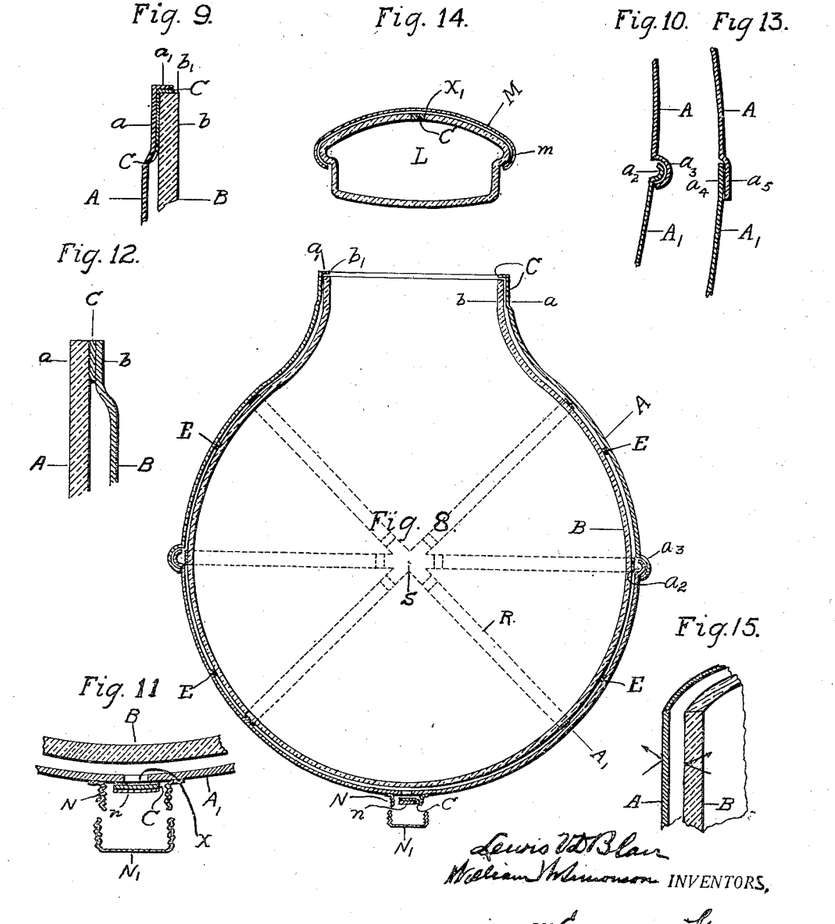
Figure 8, is a sectional view of another form of heat-insulated or vacuum vessel in which our bond may be employed.
Figures 9, 10 and 11, are enlarged sectional views showing parts of vessels revealed in Figure 8.
Figure 12, is a fragmentary view in section of a modification containing a thickened jacket.
Figure 13, is a fragmentary sectional view showing a modification of the joint uniting parts of the jacket.
Figure 14, is a sectional view of a modified form of heat-insulated or vacuum stopper.
Figure 15, is a fragmentary sectional view showing the positions of reflecting surfaces.

The sections of the jacket may be united by a beaded joint, $a^2$, $a^3$, as shown in Figures 8 and 10 or by a lap joint, $a^4$, $a^5$, as shown in Figure 13. The joint, however formed, should be hermetically sealed by brazing, soldering or by the use of the bonding compound herein described.

When vacuum bottles are made in large sizes the collapsing strain due to atmospheric pressure becomes very great and a spherical shaped bottle is best adapted to withstand these strains. The atmospheric pressure against the inner wall of the container produces tensional strains which may be neutralized by a re-inforcement which may be in the form of bands, R, encircling the container as shown in Figure 8. As illustrated each of these bands follows the major circumference of the container, the ends being connected together as by plates, S, disposed at the points of their intersection. These bands should be sufficiently thin to avoid contact with the inner wall of the jacket.

The means for closing the exhaust opening, X, is a small metal plate, $n$, carrying a layer, C, of the bonding composition, sealing being accomplished by heating the bonding material and pressing the same against the jacket after a sufficient degree of vacuum has been established. The seal is protected by a cap, $N^1$, screwed onto a collar, N, soldered or otherwise secured to the jacket.

The stopper, L, shown in Figure 14, is shown blown in one piece and as having an exhaust opening, $X^1$, which, after a vacuum has been established, is closed by bonding material, C, or by bonding material reinforced by a plate of metal, such as, $n$, in Figure 11. A protective cap, $M^1$, is used in this construction to obscure and protect the seal, the margin of the cap being spun or crimped over an integral bead, $m$, of the stopper.

The exhaust opening through which the air is drawn may be formed in the bonding composition at any suitable point, as at, $X^3$, Figure 3, by using a suitable core, which must however be withdrawn while the bonding material is still in a plastic condition. The resulting aperture will serve the same purpose as the opening, X, in the jacket or the openings, $X^1$, $X^2$, in the stoppers, and may be similarly closed.

The vacuum is drawn in a usual way the vessel being preferably heated so that the moisture as well as the air is exhausted from the vacuum space.

The final sealing of the vacuum chamber is done in vacuo in the usual manner, heat being applied by radiation, or by conduction through contacting elements, to fuse the bonding compound and complete the vacuum seal.

Loss of radiant heat will be restricted by the use of the usual silvering, or by polishing of the walls of the vacuum space.

In Figure 15, A, represents an opaque outer jacket and, B, the wall of the transparent container. The jacket is provided with an external reflecting surface and the wall, B, is also provided with an external reflecting surface. Radiant heat from external sources is reflected from the jacket, A, as shown by the bent arrow, and radiant heat from internal sources is reflected back through the diathermanous wall, B, as shown by the bent arrow. The contents of the container will therefore be maintained at a uniform temperature, external heat being excluded and internal heat being retained.

Among the advantages of our invention are the elimination of strains produced by fused joints, the avoidance of distortions of the glass which are liable to occur at high temperatures, the ability to use stronger, or thicker, cheaper and more easily obtainable glass, as well as the possibility of substituting metal, porcelain or other substances for glass in the outer jacket, or wherever desired.

Our invention enables us to make vacuum utensils or other heat insulated vessels of a wide variation of limits in sizes, shapes and uses, and when made wholly or partially of glass to be of sufficient strength and cheapness to be used as shipping containers for perishable foods. The thin glass walls of the ordinary vacuum vessel make the vessel inherently weak and liable to collapse under atmospheric pressure if vessels are made in large sizes, or when such vessels are subjected to the abuse of normal transportation handling. The ordinary vacuum vessel is necessarily of a design compelled by the use of the autogenous weld at the necks of the container and the jacket, the design being determined by the ability of the glass maker to construct the lower portion of the jacket and effectuate the closure thereof. Our invention admits of the making of the jacket of a plurality of bonded parts of any desired pattern, and thus give to the entire vessel any suitable design.

By the use of our adherent compound, we are enabled to make the outer jacket, as well as other parts of our vessel, in separate pieces and to firmly unite these pieces, even though they are composed of substances which cannot be united by fusion. The joints which we produce by the use of our fusible and adherent compound, are especially useful where joints produced in known ways, as, for instance, by soldering, brazing, sweating or interlocking, must now be employed.

When in the claims we use the expression "heat treated," we refer to a material such as an organic exudate, or derivative of the same, which has been so changed by heat, as to harden it and raise its melting or fusion temperature, and make it strongly adherent when cooled.

The expression "matured," as employed in the claims, identifies a bond composed of any water-insoluble organic substance, combined or uncombined, or mixed or unmixed with metallic or other substances, and remaining solid at temperatures below 212° F., which, either before or after being applied, has been so chemically or physically altered by partial or complete heat treatment as to enhance its normal adherence to a contacting substance upon evaporation of its solvent, if it be in solution, or upon solidification, if it be in a fused condition; and the expression "adherent bond" or adherently secured, excludes solder, which, when molten, is miscible with metals, and glass, which when fused, is miscible with glass, neither of these substances being adherent to other substances in the true sense.

The term "viscous," as employed herein, refers to that property of an organic substance, exudate or material, such as lac, imparted to it by a solvent or by fusion, such a substance being viscous when in either a dissolved or a fused condition. When such a substance is applied as a solution, the heat treatment will evaporate the solvent, and thereafter act upon the substance and mature it in same way that it matures the initially undissolved substance.

The term "condensed" as herein employed refers to the rearrangement of molecules to produce a product which is different from the starting material.

The expression "chemically stable" refers to that quality of a substance which enables it to remain unaffected by any other substance which comes in contact with it, in such uses as described.

The expression "abnormal adherence" has reference to the fact that the substance employed as a bond has greater adherency to adjacent objects than it would have if it were untreated.

An organic substance, such as lac, treated as herein described, may be either partially or completely matured, according to the length of the period of treatment, or the temperature employed, and thermal treatment may be continued to effectuate complete induration of the substance, when it becomes infusible, unless the heat is such as to cause dissociation of the partially indurated product. The substance constitutes a bond possessing considerable adhesion, if only matured in a limited degree, but when matured in a maximum degree, its ability to adhere to solids when solidified from its state of fusion, is greatly enhanced, as is also its ability to resist the action of solvents, the degree of the adhesion and of the insolubility being substantially commensurate with the degree of the heat treatment.

Having thus described our invention, what we claim and desire to secure by Letters Patent is:

1. A heat-insulated jacketed vessel, including an inner container, an outer jacket and an adherent matured organic bond solidified in situ elastically uniting said jacket and said container.

2. A heat-insulated jacketed vessel, consisting of a plurality of unfused parts, and an intervening, condensed and hardened organic bond fused to said unfused parts and solidified in situ.

3. A heat-insulated jacketed vessel, including an inner container and an outer jacket united by an intervening adherent bond, said bond being composed of a matured organic material solidified in situ and which is less fusible than the unfused material from which it is produced.

4. A heat-insulated vessel having parts united by a water-insoluble, chemically-stable bond of organic material, solidified in situ and having abnormal adherence to said parts.

5. A heat-insulated vessel having parts united by a water-insoluble, chemically-stable bond of organic material associated with metal, solidified in situ and having abnormal adherence to said parts.

6. A heat-insulated vessel including an inner vitreous container, an outer jacket, and a matured elastic bond solidified in situ, the container having gentle curves and being devoid of angles or abrupt curves, whereby expansive thrusts are compensated for in all parts thereof, and danger of fracture by changes of temperature minimized.

7. A heat-insulated jacketed vessel, including an inner container composed of glass, an outer jacket and a matured elastic bond, solidified in situ, whereby the glass of the inner container may be of a refractory nature, and capable of withstanding sudden changes of temperature without fracture.

8. A heat-insulated jacketed vessel including a plurality of parts, and a matured bond of dissimilar material, said bond being composed of an organic substance which remains hard at 212° F., and which is capable of strongly adhering to said parts when solidified in situ from a state of fusion.

9. Bodies of solid material adherently united by a matured metallic organic compound solidified in situ containing an organic exudate.

10. A heat-insulated jacketed vessel, including an inner container and an outer jacket, one of which is made of vitreous material, and an adherent non-vitreous matured bond solidified in situ.

11. A heat-insulated jacketed vessel, including an inner container and an outer jacket, both made from vitreous material and an adherent heat-treated non-vitreous bond solidified in situ, said container and jacket having substantially uniform internal stresses throughout their structures.

12. A heat-insulated jacketed closure, having parts thereof united by a non-vitreous bond solidified in situ, said bond being rendered adherent by fusion being insoluble in water and being infusible at temperatures below 212° F.

13. A heat-insulated jacketed closure, including an adherent bond solidified in situ and comprising a substance which is soluble in alcohol and insoluble in water, said substance being infusible and non-adhesive at temperatures below 212° F.

14. A heat-insulated vessel, including a seal composed of a heat-treated, matured, water-insoluble, chemically stable substance solidified in situ adherently secured to adjacent parts of said vessel.

15. A seal for heat-insulated closures consisting of adjacent parts united by an adherent bond solidified in situ which is infusible at 212° F., said bond being composed of organic material which in its original state is non-adhesive.

16. A composite heat-insulated jacketed vessel, including two parts united by an organic bond, said bond being insoluble in water, infusible at 212° F., made adherent by fusion and heat treatment, and having a higher fusion temperature than its initial fusion temperature.

17. A composite heat-insulated jacketed vessel, consisting of a plurality of glass sections and an intervening bond uniting said sections, said bond being non-vitreous, insoluble in water, immiscible with glass, condensed and hardened by heat treatment, and having a coefficient of expansion approximating that of glass.

18. A composite heat-insulated jacketed vessel, consisting of a plurality of vitreous parts and an intervening, organic bond hardened by treatment and adherently secured to said parts, said bond having a coefficient of expansion substantially equal to those of the vitreous parts of the vessel.

19. A heat-insulated jacketed vessel, including a plurality of parts and an intervening bond immiscible therewith, said bond being solidified in situ containing a heat treated organic exudate, having a lower fusion temperature than the united parts and being chemically stable under ordinary conditions, adhesive when fused and adherent when cooled.

20. A composite article having parts united by a water-insoluble organic bond adherently joined to said parts, said bond being solidified in situ, indecomposable at all temperatures below 525° F., and infusible at 212° F.

21. A heat-insulated jacketed vessel, including an inner container, an outer jacket, and a bond therefor, solidified in situ and composed of a matured substance of low heat-conductivity which is adherently secured to unfused surfaces of said container and jacket.

22. A heat-insulated jacketed vessel, including an inner container and an outer jacket, united by a fused organic bond matured and solidified in situ and said outer jacket being composed of a plurality of parts united by a fused organic bond.

23. A heat-insulated jacketed vessel, having an inner container and an outer jacket composed of an upper and a lower section, said inner container being provided with an opening at its upper extremity and adjacent thereto hermetically sealed by a matured organic bond to the upper section of the outer jacket, the two sections of the outer jacket being hermetically sealed together by a matured organic bond and a part or parts of the vessel being made from vitreous or frangible material.

24. A heat-insulated jacketed vessel, including an inner container and an outer jacket united by a fused, heat-treated organic bond, said outer jacket being composed of a plurality of dissimilar bonded parts.

25. A heat-insulated jacketed vessel, having an inner container and an outer jacket bonded to said container, said outer jacket being composed of a plurality of bonded vitreous parts, one of which is substantially co-extensive with the inner container.

26. A heat-insulated jacketed vessel, having an inner container and an outer jacket, said jacket being formed in sections, and said sections having overlapping parts associated with an organic matured adherent, air-tight bond.

27. A heat-insulated jacketed vessel, having an inner container and an inherently stronger outer jacket, and an intervening adherent matured organic bond therefor solidified in situ.

28. A heat-insulated jacketed vessel, including an inner glass container and an outer glass jacket made from heavier material than said inner container, and an intervening matured bond solidified in situ.

29. A closure, adjacent parts of which are united by an adherent, non-vitreous, matured bond formed in situ by fusion.

30. A closure, having an unfused part thereof sustained by a non-vitreous matured bond formed in situ by fusion and adherently uniting said part to said closure.

31. An hermetically sealed closure, including a non-vitreous and substantially non-metallic matured bond of relatively low fusibility, said bond being rendered adherent by fusion in situ.

32. An hermetically sealed closure, including glass sections and a non-vitreous bond for said glass sections of lower fusibility than glass, said bond being composed of a material which is physically and permanently altered and rendered adherent by fusion in situ.

33. A hermetically sealed closure comprising a plurality of parts, united by a non-vitreous bond, said bond being rendered adherent by fusion and heat treatment in situ.

34. A composite hermetically sealed closure, including a glass part thereof, said glass part being united to another part of said closure by a non-vitreous substantially non-metallic bond, said bond being rendered adherent by fusion and heat treatment in situ.

35. Parts of a closure, united by a bond composed of organic material made adherent by fusion and continued heat treatment.

36. Parts of a closure, united by a bond, said bond being made adherent by fusion and continued heat treatment.

37. Parts of a closure united by a bond, said bond being made adherent by fusion and strongly adherent and solidified by continued heat treatment.

38. A sealed closure, including a glass section and a non-vitreous bond solidified in situ, said bond being composed of a heat treated substance which is substantially harder, more adherent and has a higher fusion temperature than the untreated substance.

39. A sealed closure, including a glass section and a non-vitreous bond, said bond having a coefficient of expansion substantially equal to that of the glass section and having been rendered strongly adherent thereto by fusion and continued heat treatment in situ.

40. A seal, including an adherent bond solidified in situ and composed of a treated organic substance which melts at a temperature substantially higher than the original untreated substance.

41. A seal, including an adherent bond solidified in situ and composed of a heat treated organic substance which has a stronger adherence than the untreated substance.

42. A seal, including a non-vitreous bond composed of a mixture of a metallic organic salt and an organic exudate, said bond having been rendered adherent, hard and tenacious by fusion in situ.

43. A seal, including an adherent condensed bond solidified in situ and composed of a treated organic substance which fuses at a substantially higher temperature than the original untreated substance.

44. A composite article, including parts and an adherent matured organic bond solidified in situ and uniting and having a degree of elasticity approximating the differential between the elasticities of said parts.

45. A composite article, consisting of a plurality of parts and an intervening, matured, condensed and hardened organic substance solidified in situ and adherently secured to said parts.

46. A composite article, consisting of a plurality of vitreous parts and an intervening, matured, condensed and hardened organic substance solidified in situ and adherently secured to said parts.

47. A composite article, consisting of a plurality of parts and an intervening, matured, condensed and hardened derivative of an organic exudate solidified in situ and adherently secured to said parts.

48. A composite article, consisting of a plurality of vitreous parts and an intervening, matured, condensed and hardened shellac compound solidified in situ and adherently secured to said parts.

49. A composite article, consisting of a plurality of unfused parts, and an intervening, condensed and hardened organic bond of low heat-conductivity fused to said unfused parts and solidified in situ.

50. A composite article having a substantially organic matured bond uniting parts thereof to form a seal, said bond being solidified in situ and having a higher temperature of fusion than the organic material from which the bond is produced.

51. A heat-insulated jacketed vessel, including an inner container and an outer jacket having an open end, said inner container being of a vitreous or frangible material and provided with a contracted open end or neck, said inner container being hermetically sealed by a matured organic bonding material of low heat conductivity to the outer jacket at a point adjacent its open end, said material being solidified in situ.

52. A heat-insulated jacketed vessel, having an inner container and an outer jacket, one of said parts having a flange and the other having a seat, and an adherent substantially organic matured bond solidified in situ for uniting said parts.

53. A heat-insulated jacketed vessel, having an inner container and an outer jacket, one of said parts having a flange and the other having a seat, said seat being of greater diameter than said flange, a ring supported in said seat and underlying said flange, and an adherent substantially organic bond for uniting said container and jacket.

54. A heat-insulated jacketed vessel, having an inner container and an outer jacket, one of said parts having a flange and the other having a seat, said seat being of greater diameter than said flange, and a divided ring resting upon said seat and underlying said flange, and an adherent substantially organic bond for uniting said container and jacket.

55. A heat-insulated vessel including an inner container and an outer jacket united by an intervening adherent bond, said bond being solidified in situ and composed of a matured organic material which has been rendered infusible by heat treatment.

56. A composite article including an organic bond, said bond being fused in situ and heat-treated to render it infusible.

57. The combination with a heat-insulated jacketed vessel, having a seal and a protecting threaded ring therefor, of a cap for said vessel having a screw thread for engaging said ring.

58. A heat-insulated receptacle of the type wherein the body of the container is too large to pass through the mouth of the jacket, said receptacle including the plural parts of a multi-part jacket, a single-walled container of frangible character having an up-standing neck, and a protective element surrounding and extending over the top of said neck, said protective element being supported by said jacket and having an external anchorage whereby a further element, such as a cap or a drinking cup, may be attached to said receptacle.

59. A heat-insulated jacketed vessel, having an inner container and a vitreous outer jacket bonded together by an intervening, organic, condensed and hardened bond solidified in situ, said jacket having a protecting cap permanently attached at its lower end.

60. A heat-insulated jacketed vessel, having an inner container and a vitreous outer jacket, said outer jacket being provided with a circumferential groove near the lower end thereof, and a non-vitreous cap for the bottom of said jacket engaging said groove.

61. A heat-insulated jacketed container, having a circumscribing reinforcement, the parts of which may act tensionally to resist expansive forces transmitted from within the container.

62. A heat-insulated jacketed vessel, having a vitreous inner container and an outer jacket, said inner container having circumscribing reinforcing elements exterior thereof.

63. A heat-insulated vessel, having an outer jacket and an inner container and a brace for the walls of said jacket and container, said brace being adherently bonded to said walls by a condensed and hardened organic substance.

64. A heat-insulated jacketed vessel, having an opaque single wall outer jacket and a diathermanous single wall, inner container, the outer surfaces of said jacket and container being reflective of heat rays.

65. A heat-insulated vessel including an outer jacket, an inner frangible container and an intervening bond, said bond being solidified in situ infusible at 212° F., insoluble in water, unaffected by weak acids or alkalis and impervious to air.

66. A heat-insulated vessel, having a porous part coated with a water-insoluble matured organic substance.

67. A heat-insulated vessel, having a nonmetallic and porous part coated with a water-insoluble matured organic substance.

68. The process of bonding parts of composite articles, which consists in heating a mass of organic exudate in situ between and in contact with said parts, to thereby change its character to render it strongly adherent to said parts.

69. The process of bonding parts of composite articles, which consists in heating a solution containing a fusible solute in situ between and in contact with parts of a composite article, to thereby evaporate the solvent and change the character of the solute to render it strongly adherent to said parts.

70. The process of bonding parts, which consists in causing a fluent, viscous, matured, organic substance to solidify in contact with said parts.

71. The process of bonding parts of composite articles, which consists in heating one of the parts, applying said part to a fusible bonding material, thereby causing some of said material to stick to said part, applying another part to the adhering mass, and heat-treating the mass until it becomes firmly adherent to both parts.

72. The process of producing a composite article, which consists in applying a mass of fusible indurated organic exudate in a heated atmosphere to adjacent parts thereof, heating the exudate to a temperature of fusion below the fusion temperature of said parts and so maturing the exudate by heat treatment as to increase its adherence.

73. The process of assembling and bonding the parts of an insulated receptacle, having a composite jacket, and a vitreous container capable of being inserted into a part of said jacket, which consists in arranging the container and a part of the jacket in concentric relation, bonding the container and said part together, uniformly heating said parts and said bond throughout, and then completing the outer jacket by securing a closure thereto.

74. The process of sealing the vacuum space of a vacuum vessel, which consists in withdrawing the air from said space through an opening, fusing a closure having a relatively low melting point, and causing the fused closure to become abnormally adherent by heat treatment to the unfused material at the opening.

75. The process of sealing the vacuum space of a vacuum vessel, which consists in withdrawing the air from said space through an opening in a glass wall of said vessel, fusing a closure having a relatively low melting point, and causing the fused closure to become abnormally adherent by heat treatment to the unfused glass at the opening.

76. The process of producing a closure which consists in heating a mass or organic exudate in contact with a body, to thereby change its character to render it strongly adherent to said body.

77. The process of joining parts of a composite article, which consists in subjecting an organic exudate which is in contact with said parts, to heat and fusing the same at a temperature at which said exudate becomes adherent and is rendered infusible at temperatures below the boiling point of water, and at which said parts remain substantially unaffected by the heat.

78. A heat-insulated vessel having walls united to each other by a fused cement which is solidified in situ and is infusible at 212° F.

79. A heat-insulated vessel having its concentric walls united to each other by a fused heat-treated cement, being infusible at 212° F. and solidified in situ, said cement constituting the sole physical connection between said walls.

80. An insulated vessel having an inner container and an outer jacket, said inner container being united to said outer jacket by a heat insulating bonding material solidified in situ which is infusible at 212° F.

81. Bodies of solid material adherently united by a matured organic compound solidified in situ and, containing an organic exudate.

82. A heat-insulated vessel having a part coated with a water-insoluble matured organic substance to restrict the conducting properties of the part.

83. A seal including an adherent bond solidified in situ and composed of a treated organic substance which has a stronger adherence than the untreated substance, said bond being infusible at 500° F., and insoluble in water, weak alkalis and alcohol and impervious to air.

84. A heat-insulated vessel including an inner container, an outer jacket, and an intervening bond solidified in situ and consisting of lac which has been matured by heat treatment.

85. A composite article consisting of a plurality of parts and an intervening adherent bond solidified in situ and consisting of lac which has been matured by heat treatment.

86. The process of bonding parts which consists in fusing lac in contact with said parts and heat-treating the lac in situ to mature the bond.

87. The process of bonding parts which consists in fusing an organic material in situ between said parts, and heating said organic material until it solidifies and becomes infusible.

88. A heat-insulated vessel including an outer multi-part jacket and an inner container, said inner container having a body portion too large to pass through the mouth of said jacket and having its inner surface of a nonporous nature, and an intervening adherent bond adapted to hermetically seal the space between said container and said jacket and to maintain said jacket in fixed relation to said container.

89. A heat-insulated vessel including an outer multi-part jacket and an inner container, said inner container having a body portion too large to pass through the mouth of the jacket and having a non-porous surface and an intervening adherent homogeneous bonding and sealing substance solidified in situ for maintaining said container in fixed relation to said outer jacket.

90. A heat-insulated vessel including a multi-part jacket, and a single-walled frangible container adherently united by an additional and homogeneous mass of material constituting a bond of sufficient elasticity to compensate for unequal expansions and contractions of said jacket and said container due to varying thermal influences within and without said vessel.

91. A heat-insulated receptacle including a jacket, a single-walled container having an inner vitreous surface and an intervening bond of dissimilar material solidified in situ and uniting said jacket and said container at their upper ends, said bond possessing a degree of elasticity sufficient to compensate for unequal expansions and contractions of said ends due to varying thermal conditions within and without said receptacle.

92. A heat-insulated receptacle including a multi-part jacket, a frangible container too large to pass through the mouth of said jacket and an intervening homogeneous bonding and sealing substance solidified in situ and uniting said jacket to the container at the open end, said substance constituting a substantial physical connection between said jacket and said container and possessing a degree of elasticity sufficient to compensate for unequal expansions and contractions of said container and jacket at the open end due to varying thermal conditions within and without said receptacle.

93. A heat-insulated vessel including a multi-part jacket, a single-walled frangible container and an elastic adherent bond of dissimilar material solidified in situ and uniting said jacket and said container and adapted to compensate for unequal circumferential expansions and contractions therein due to thermal variations within and without said vessel.

94. A heat-insulated receptacle including a multi-part jacket, a container, consisting of a material having low heat conductivity, and a homogeneous bonding seal of dissimilar material also having low heat conductivity, said container having a body portion too large to pass through the mouth of the jacket and being secured to and maintained in said jacket by said seal.

95. A composite article having parts united to each other by a fused cement solidified in situ and which is infusible at 212 degrees F.

96. An article of manufacture, consisting of a part having a coating of a matured and heat-treated substance of organic nature formed in situ and adherently united thereto.

97. An article of manufacture, consisting of a part having a coating of heat-treated lac formed in situ and adherently united thereto.

98. A heat-insulated receptacle including an outer jacket and a heavy-walled inner container having a body too large to pass through the mouth of said jacket and of frangible material, said container being spaced from said jacket, said jacket being formed in sections and having an inturned protective portion at its upper end extending over a part of said container, said protective portion being secured to said container by a mass of material hardened in situ.

99. A heat-insulated receptacle having a heavy-walled container of frangible material, a multi-part jacket, a protective collar of non-frangible material surrounding the upper extremity of and extending over said container, said collar being secured to said jacket, and non-conducting material solidified in position and sealing the space between the collar and the container, the body of said container being too large to pass through the mouth of said jacket.

100. A heat-insulated receptacle having a single-walled container of heavy frangible material, a multi-part jacket, and a screw-threaded collar having an inturned flange extending over a portion of said container and crimped to the upper portion of said outer jacket, said jacket having a closure secured to the lower end thereof.

101. A heat-insulated receptacle having a heavy-walled container of frangible material, a multi-part jacket, and a protective collar of non-frangible material surrounding the upper extremity of and extending over said container, said collar being secured to the container by an adherent and non-conducting mass deposited between said container and said collar, and said mass sealing the space between the container and the jacket at the upper extremity thereof.

102. A heat-insulated receptacle including a heavy single-walled frangible container, a composite outer jacket, and a bonding substance chemically altered in situ for uniting the upper portions of said container and said jacket.

103. A heat-insulated receptacle having an inner frangible container, a multi-part outer jacket having a mouth too small for said container to pass therethrough, and a bonding material solidified in situ, interposed between and adapted to unite the necks of said container and said jacket while the material of said container is maintained in an unfused condition, said bonding material constituting substantially the only means spanning and sealing the space between said necks, and operating to exclude air and to hold said container and said jacket in pre-determined spaced relation to each other.

104. The process of assembling the parts of a heat-insulated receptacle having a container provided with a neck, and a multi-part jacket the upper part of which has a neck carrying an inturned flange at its top, which consists in introducing the container into the upper part of said jacket until it is arrested by said flange, employing means for arranging said container and said upper part of the jacket in concentric relation, joining said parts together by a material which is solidified in situ, and, finally, uniting the parts of the jacket to thereby enclose said container within them.

105. A heat-insulated receptacle having a single heavy-walled frangible container provided with an external annular shoulder, proximate its upper extremity, and a multi-part jacket provided with a part having an inturned flange extending over and engaging the shoulder of said container.

106. A heat-insulated receptacle including a jacket, a single-walled pendent container within said jacket, and a ring situated at the top of said jacket and extending from a portion of said jacket over a portion of said container, said ring being provided with external means to engage and interlock with an inverted drinking cup.

107. A heat-insulated receptacle of the type wherein the substantial means of sustention is at the top of the receptacle and the receptacle is of the kind wherein the body of the container is too large to pass through the mouth of the jacket, said receptacle including a multi-part jacket, a heavy single-walled container having a vitreous inner surface and having a neck concentrically arranged within the neck of said jacket, and a mass of material fixedly held between said necks and of sufficient strength to substantially maintain the normal relations of the jacket and the container, said mass of material being hardened in situ and constituting means for preventing vertical movements of the container, and the body of the jacket being heat-insulated from the body of the container.

108. A heat-insulated receptacle of the type in which the container is a permanent part, said receptacle including a multi-part jacket, and a heavy single-walled frangible container provided with a neck having an irregular outer surface by means of which said container is pendently supported within said jacket from an anchorage with which said receptacle is provided and the body of said container being too large to pass through the mouth of the jacket.

109. A heat-insulated receptacle of the kind wherein the container is of the heavy single-walled frangible type and the body is too large to pass through the mouth of the jacket, said receptacle including a jacket having a neck provided with internal irregularities, material disposed within said neck and engaging said irregularities, and a container pendently supported within said jacket and having a neck that is provided with external irregularities receiving said material.

110. A heat-insulated receptacle of the type wherein the body of the container is too large to pass through the mouth of the jacket, said receptacle including a multi-part jacket, a single-walled frangible pendent container spaced at its neck from the neck of said jacket, material hardened in situ and disposed between said necks and means associated and cooperating with said material for preventing vertical movements of said container.

111. A heat-insulated receptacle of the type wherein the body of the container is too large to pass through the mouth of the jacket, said receptacle including a multi-part jacket provided with a neck having an irregular inner surface proximate its top, a frangible single-walled container and material hardened in situ, disposed within said neck, conforming to the irregularities thereof, and closing the space between said neck and the adjacent part of the container, said container being supported in said jacket at the upper end thereof and being spaced from said jacket at its sides and bottom.

112. A heat-insulated receptacle of the type wherein the body of the container is too large to pass through the mouth of the jacket, said receptacle including a multi-part jacket, a single-walled frangible container and material extending across the space between the necks of said jacket and said container, the neck of said container having an irregular outer surface conforming to the inner surface of said material, and there being in the device an inturned flange extending over said material to prevent relative vertical movements of the jacket and the container.

113. A heat-insulated receptacle of the type wherein the body of the container is too large to pass through the mouth of the jacket, said receptacle including a multi-part jacket, a single-walled frangible container, said container having an irregular portion proximate its top, a screw-threaded flanged part for engaging a drinking cup, and extending over a portion of the neck of the container, and material closing the space between the necks of the jacket and the container and cooperating with said flange to prevent relative vertical movements of the said jacket and said container.

114. A heat insulated receptacle of the type wherein the body of the container is too large to pass through the mouth of the jacket, said receptacle having a neck, and including a single-walled container of frangible material, having an irregular outer surface near its top, a multi-part jacket having near its top an irregular inner surface, and material conforming to the irregularities of the outer surface of the container and the inner surface of the jacket and closing the space and establishing a relatively fixed relation between the necks of said container and said jacket.

115. A heat-insulated receptacle of the type wherein the body of the container is too large to pass through the mouth of the jacket, said receptacle including a multi-part jacket, a container having a vitreous inner surface, said container being spaced from said jacket, material closing the space therebetween, and overlapping elements one of which extends from said jacket inward, and the other of which extends from said container outward, for sustaining said container from its upper end in concentric relation to said jacket.

116. A heat-insulated receptacle of the type wherein the body of the container is too large to pass through the mouth of the jacket, said receptacle including a multi-part jacket, a single-walled container having a vitreous inner surface, said container being spaced from said outer jacket, material closing the space there-between, and over-lapping elements one of which extends from said jacket inward, and the other of which extends from said container outward, and cooperating with the material to sustain said container from its upper end in concentric relation to said jacket.

117. A heat-insulated receptacle of the type wherein the body of the container is too large to pass through the mouth of the jacket, said receptacle including a multipart jacket having a portion capable of acting as a seat, a single-walled container having a non-porous and vitreous inner surface, a mass of material closing the entrance to the space between said jacket and said container, said space being heat insulated, and the construction being such that the weight of said container is sustained by said seat.

118. A heat-insulated receptacle of the type wherein the body of the container is too large to pass through the mouth of the jacket, said receptacle having a cavity for the reception of hot or cold liquids or solids, a multi-part jacket, a heat-insulating space in part bounded by the wall of said jacket, and a single frangible wall separating said cavity from said heat-insulating space and terminating in an up-standing neck, said receptacle also including means supported by said jacket and surrounding and extending over said neck and constituting a protection therefor, said means having an external anchorage whereby a further element, such as a cap or a drinking cup, may be attached to said receptacle.

119. A heat-insulated receptacle having a container and a jacket, one of said parts having a flange and the other a seat, said seat being of greater diameter than said flange, and a ring supported by said seat and underlying said flange.

In testimony whereof, we affix our signatures.

WILLIAM W. SIMONSON.
LEWIS VD. BLAIR.

Witnesses:
 CHARLES E. BULTENCLAM,
 HARRY E. INALI.